United States Patent
Hessel et al.

(10) Patent No.: US 7,949,082 B2
(45) Date of Patent: May 24, 2011

(54) PHASE LOCK LOOP AND METHOD FOR CODED WAVEFORMS

(75) Inventors: Clifford Hessel, Rochester, NY (US); Paul E. Voglewede, Churchville, NY (US)

(73) Assignee: Harris Corporation, Melbourne, FL (US)

( * ) Notice: Subject to any disclaimer, the term of this patent is extended or adjusted under 35 U.S.C. 154(b) by 104 days.

(21) Appl. No.: 11/651,566

(22) Filed: Jan. 10, 2007

(65) Prior Publication Data

US 2007/0195913 A1    Aug. 23, 2007

(51) Int. Cl.
    *H03D 3/24*    (2006.01)
(52) U.S. Cl. .................... 375/376; 375/354; 375/355
(58) Field of Classification Search .......... 375/354–355, 375/376
    See application file for complete search history.

(56) References Cited

U.S. PATENT DOCUMENTS

| | | | | |
|---|---|---|---|---|
| 3,909,735 A * | 9/1975 | Anderson et al. | ................. | 331/10 |
| 4,037,171 A | 7/1977 | Cordell | | |
| 4,409,563 A * | 10/1983 | Vandegraaf | ................. | 331/11 |
| 4,853,642 A * | 8/1989 | Otani et al. | ................. | 329/306 |
| 5,065,107 A * | 11/1991 | Kumar et al. | ................. | 329/308 |
| 5,455,536 A * | 10/1995 | Kono et al. | ................. | 329/325 |
| 5,563,921 A | 10/1996 | Mesuda et al. | | |
| 5,594,389 A | 1/1997 | Kiyanagi et al. | | |
| 5,625,652 A | 4/1997 | Petranovich | | |
| 6,111,470 A | 8/2000 | Dufour | | |
| 6,114,987 A | 9/2000 | Bjornholt | | |
| 6,236,687 B1 | 5/2001 | Caso et al. | | |
| 6,608,826 B1 | 8/2003 | Mesecher et al. | | |
| 7,183,863 B1 * | 2/2007 | Bedrosian | ................. | 331/25 |
| 2001/0024142 A1 * | 9/2001 | Tan et al. | ................. | 331/25 |
| 2002/0070779 A1 * | 6/2002 | Matsui | ................. | 327/156 |

* cited by examiner

*Primary Examiner* — Chieh M. Fan
*Assistant Examiner* — Freshteh N Aghdam
(74) *Attorney, Agent, or Firm* — Duane Morris, LLP

(57) ABSTRACT

A system and method is disclosed for maintaining synchronization in a communication system in which a signal is sent from a transmitter to a receiver which includes a phase lock loop. The receiver compares the output of a Viterbi decoder with the output of a quick decision circuit. The Viterbi decoder, which incorporates traceback, determines the minimum aggregate Euclidean distance for multiple symbols. The quick decision circuit determines the minimum Euclidean distance for a single symbol without decoding the symbol. If the difference in the output signals of the Viterbi decoder and the quick decision circuit is greater than a predetermined threshold, the phase error signal in the phase lock loop is prevented from updating the phase lock loop filter. A synchronization loss detector may also be used to prevent the phase error signal from updating the phase lock loop filter if synchronization loss is detected.

19 Claims, 5 Drawing Sheets

PHASE LOCK LOOP AND METHOD FOR CODED WAVEFORMS

RELATED APPLICATIONS

The present application is related to commonly assigned U.S. patent application Ser. No. 10/098,470 entitled "ARQ COMBINING HOLDOFF SYSTEM AND METHOD", filed 18 Mar. 2002, now U.S. Pat. No. 7,036,065 the disclosure of which is hereby incorporated herein by reference.

BACKGROUND OF THE INVENTION

The present invention relates to phase lock loops in communication systems and improved methods for maintaining synchronization between a transmitter and a receiver. More specifically, a novel system and method is disclosed which incorporates an outlier rejection filter and a synchronization loss detector with the phase lock loop to thereby maintain the integrity of the phase lock loop during reception at the receiver of corrupted signals from the transmitter that is communicating with the receiver and/or when the receiver receives spurious signals from sources other than the intended transmitter. Corrupted signals from the transmitter and spurious signals from either the transmitter in the communication system or signals from sources other than the transmitter in the communication system, such as a jammer, are referred to herein as, individually and collectively, "outliers".

Generally, the inventive system and method maintains synchronization in a communication system in which a communication signal comprising a carrier and a data signal is sent from a transmitter to a receiver which includes a phase lock loop. The receiver compares the output of a Viterbi decoder with the output of a quick decision circuit. The Viterbi decoder, which incorporates traceback, determines the minimum aggregate Euclidean distance for multiple symbols. The quick decision circuit determines the minimum Euclidean distance for a single symbol without decoding the symbol. A delay circuit is placed in series with the quick decision circuit to compensate for the traceback delay in the Viterbi decoder. If the difference in the output signals of the Viterbi decoder and the quick decision circuit is greater than a predetermined threshold, thereby indicating that the communication signal received is an outlier, the phase error signal in the phase lock loop is prevented from updating the phase lock loop filter.

A typical prior art fast acquisition phase lock loop includes a reference oscillator, a mixer, and a filter. The filter is typically a fixed bandwidth filter. Fixed bandwidth filters have several disadvantages when used in a phase lock loop. When the receiver is not in phase lock, a fixed filter bandwidth limits the speed with which phase lock can be achieved. When attempting to achieve phase lock, a wide bandwidth is preferred so as to increase the speed of acquisition of phase lock since a wider bandwidth is more likely to encompass the frequency of the received communication signal. Once phase lock is achieved, a narrow bandwidth is preferred so as to reduce the noise in the output signal of the phase lock loop. Therefore, it is advantageous to incorporate a dynamic bandwidth filter in the phase lock loop. However, even the use of a dynamic filter in the phase lock loop will not overcome the degradation caused by the reception and processing of an outlier signal. The present invention's use of an outlier rejection filter and synchronization loss detector overcomes the problems inherent with the reception and processing of outlier signals, whether a fixed bandwidth filter or a dynamic bandwidth filter is used in the phase lock loop.

Additionally, the output signal from the Viterbi decoder is used to extract the carrier from the received communication signal by use of a lookup table to generate phase angle information as a function of the Viterbi decoder output signal. The phase angle information is combined with the Viterbi decoder output signal to reconstitute the data signal in the communication signal. The reconstituted data signal is combined with the communication signal, which has been delayed to compensate for the traceback delay in the Viterbi decoder, in order to extract the carrier. It is to be understood that the use of a look-up table is but one way to generate phase angle information and other methods of generating phase angle information, such as computing the phase angle from previously known or contemporaneously received parameters and/or measurements, determining the angle information of the received signal prior to sending the signal to the Viterbi decoder and storing the angle information for combining with the output signal from the Viterbi decoder, etc., are contemplated by the invention.

Receivers with phase lock loops are well known in the art. Typical prior art phase lock loops, such as a Costas loop for example, typically include a complex mixer which compensates for phase and frequency offsets between the received communication signal and the phase and frequency of a signal generated by a local voltage controlled oscillator ("VCO"). Prior art phase lock loops may also include a quick decision circuit to extract the data signal from a communication signal, a mixer to combine the data signal with the communication signal to extract the carrier wave, a phase detector to determine the phase error between the carrier and a reference signal, a phase loop filter which generates a signal responsive to the phase error in order to control the output signal of the VCO being applied to the complex mixer.

The prior art phase lock loop is susceptible to degraded operation due to the reception of outlier signals and the processing of those outlier signals as intended communication signals. For example, if the receiver receives a corrupted signal from the intended transmitter, the phase lock loop determines the phase error of the corrupted signal as if the corrupted signal were an intended communication signal, i.e., as if the corrupted signal included data to be communicated from the transmitter to the receiver. The communication signal from the transmitter can be corrupted by any means that normally corrupt a signal, such as loss or synchronization, reception of a multipath component of the communication signal, low signal to noise ratio, etc. Likewise, if a spurious signal is received by the receiver, the phase lock loop determines the phase error of the spurious signal.

The phase error of an outlier signal, when applied to the phase loop filter, degrades the operation of the phase lock loop by inserting information into the phase loop filter that does not correspond to an actual communication signal. Therefore, the phase loop filter will send control signals to the VCO that will cause the VCO to send signals to the complex mixer that will, in turn, increase the difference between the phase and/or frequency of the VCO signal and the phase and/or frequency of the received communication signal. Consequently, the phase lock loop will no longer track the received communication signal and the signal will be lost, necessitating reacquisition of the signal.

Additionally, typical VCOs used in the industry are expensive, do not track the received communication signal well, and/or require a lot of power to operate. The poor operation of VCOs results in the loss of the communication signal or result in dithering about the phase and frequency of the received communication signal thereby increasing the receiver's power requirements. In receivers that operate with a small power source, such as handheld receivers, the power drain associated with an inexpensive VCO is undesirable. Expensive VCOs are also undesirable as the cost of the overall receiver is increased.

Thus there is a need for an improved phase lock loop to overcome the limitations of the prior art by minimizing degradation in the operation of the phase lock loop caused by the reception of outlier signals and to do so at an affordable cost. Additionally, there is a need for a phase lock loop that operates without a voltage controlled oscillator.

One embodiment of the present invention avoids the problems of the prior art by including an outlier rejection filter and a synchronization loss ("sync loss") detector to control the operation of the phase lock loop and prevent the degradation of the phase lock loop due to the reception of outlier signals.

Accordingly, it is an object of the present invention to obviate many of the above problems in the prior art and to provide a novel phase lock loop system and method.

It is another object of the present invention to provide a novel system and method for maintaining the integrity of a phase lock loop by incorporating an outlier rejection filter and a synchronization loss detector with the phase lock loop.

It is yet another object of the present invention to provide a novel system and method for operating a phase lock loop without a voltage controlled oscillator.

It is still another object of the present invention to provide a novel system and method for reducing noise in a fast acquisition phase lock loop.

It is a further object of the present invention to provide a novel system and method for maintaining phase lock by changing the bandwidth of the phase loop filter as a function of the difference between the output signals of a quick decision circuit and a Viterbi decoder.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

With reference to the drawings, like numerals represent like components throughout the several drawings.

Figure 1A:
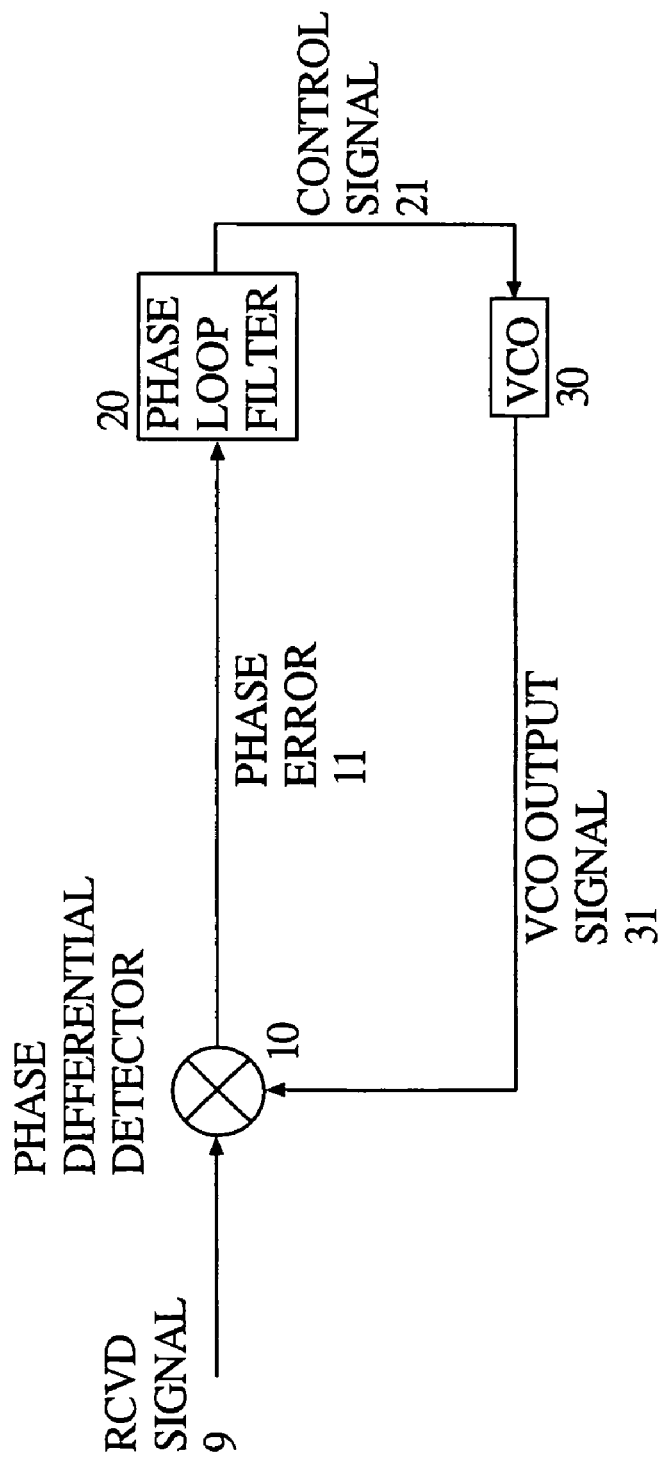
FIG. 1A is a functional block diagram of a basic prior art phase lock loop.

FIG. 1A depicts a typical simple block diagram of a prior art phase lock loop. A received signal 9 comprising carrier and data is input into the phase differential detector 10. The phase differential detector determines the difference in frequency between the received signal 9 and the VCO output signal 31 and produces therefrom a phase error signal 11 which is input to the phase loop filter 20. The phase loop filter produces a control signal 21 which is input to the VCO 30. The VCO produces the VCO output signal 31 the frequency of which is determined by the VCO as a function of some parameter of the control signal 21, typically the voltage level of the control signal.

Figure 1B:
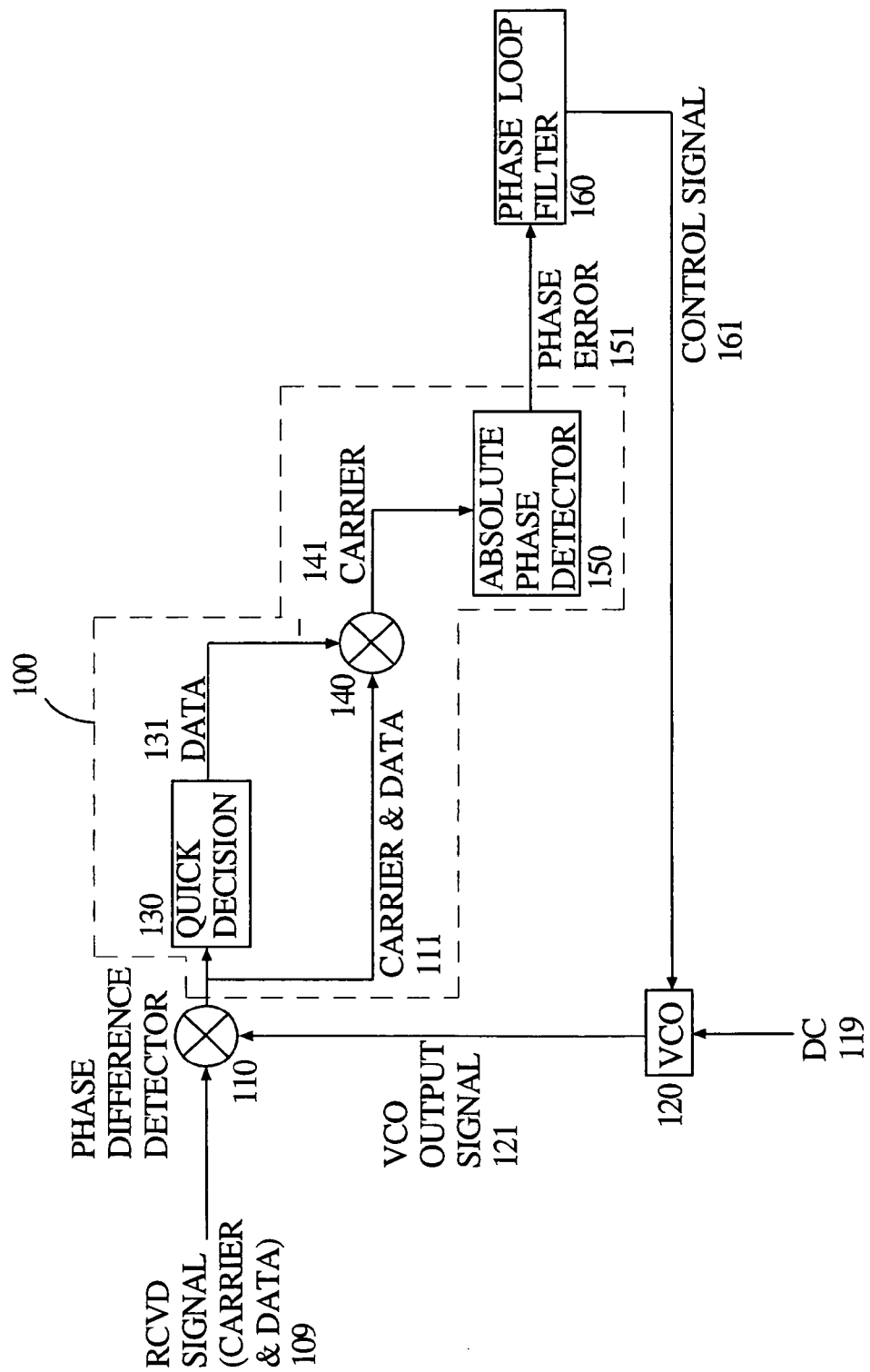
FIG. 1B is a functional block diagram of a prior art phase lock loop where the output of the phase loop filter controls the response of the voltage controlled oscillator ("VCO") and a quick decision circuit is used to extract the carrier from the received signal.

With reference to FIG. 1B, a typical prior art phase lock loop for a receiver in a communication system is shown in block diagram form. FIG. 1B is the same as FIG. 1A with the addition of the components in block 100. A received signal 109 comprising carrier and data is input into the phase difference detector 110, which combines the received signal 109 with the VCO output signal 121. The output of the phase difference detector is a carrier and data signal 111 which is input into the quick decision circuit 130 and the mixer 140. The quick decision circuit, as is known in the art, is used to determine which of the known valid symbols for the communication system is closest to the received symbol. The operation of the quick decision circuit will be discussed further below. The output of the quick decision circuit is the data signal 131 which is applied to the mixer 140. The mixer combines the carrier and data signal 111 with the data signal 131 to thereby extract the carrier signal 141 which is applied to the absolute phase detector circuit 150. The absolute phase detector circuit determines the phase of the carrier signal 141. The absolute phase detector circuit outputs the phase error signal 151, which is a function of the phase of the carrier signal 141. The phase error signal 151, is applied to the phase loop filter 160 which, in turn, generates the control signal 161 for controlling the VCO 120. The VCO, without the control signal 161, produces the output signal 121 based on the DC input signal 119. The VCO output signal is adjusted as a function of the control signal 161, typically as a function of the voltage level of the control signal. The VCO output signal 121 is applied to the complex mixer 110 as discussed above.

In a Costas loop, for example, the absolute phase detector 150 is a wire. However for more complicated waveforms, a transformation function, such as translating the I and Q signals of the carrier signal 141 into the phase error signal 151, is required and is provided by the absolute phase detector 150.

Figure 2:
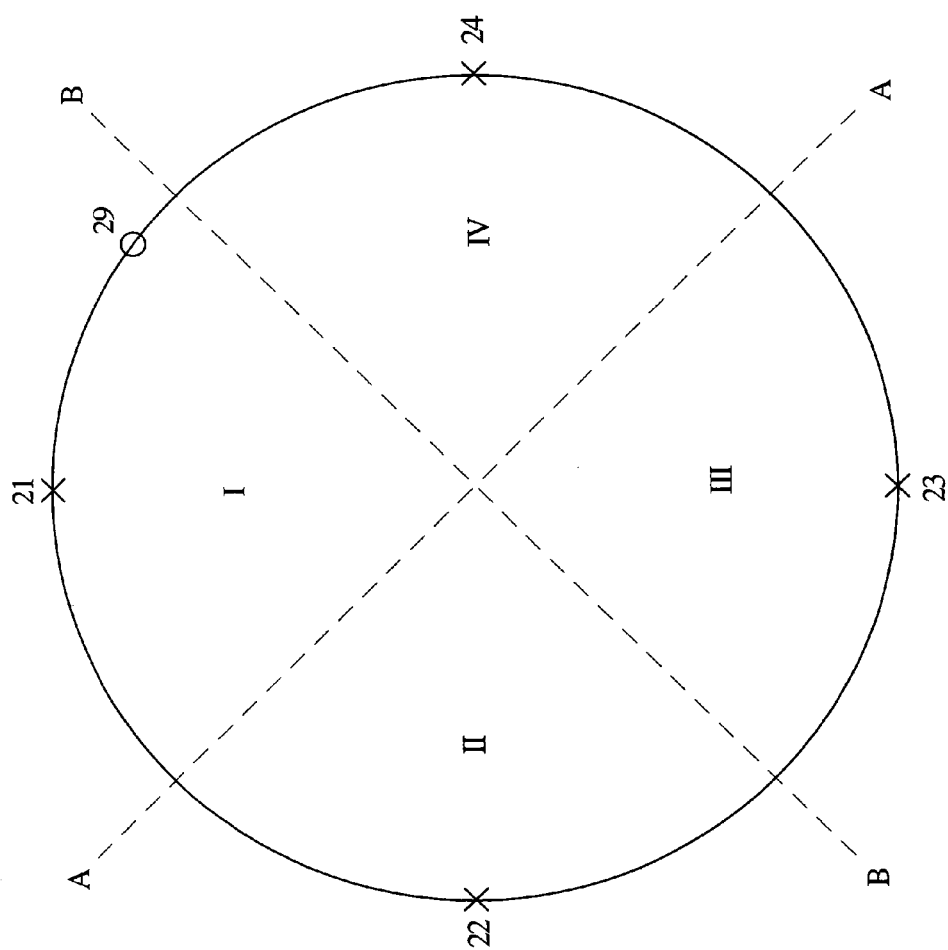
FIG. 2 is a pictorial representation of the operation of a quick decision circuit as is known in the art.

FIG. 2 illustrates the operation of a well-known quick decision circuit. It is to be understood that the quick decision circuit shown in FIG. 2 is exemplary only and that the invention is designed to operate with any kind of quick decision circuit employed. The quick decision circuit determines which of the set of known valid symbols is closest to the received symbol. The quick decision circuit then assigns the received symbol the value of the closest valid symbol. The quick decision circuit makes this determination on a symbol-by-symbol basis with no memory of preceding symbols and no knowledge of transmission rules for the communication system. For example, FIG. 2 depicts four valid symbols, designated 21, 22, 23, and 24. The constellation of possible received symbols is divided into four quadrants, designated I, II, III, and IV by the lines A-A and B-B. For any received symbol falling in the I quadrant, the quick decision circuit would assign the received symbol the value of the symbol 21. Likewise, any received symbol falling in the II quadrant would be assigned the value of symbol 22, as so on.

Figure 3:
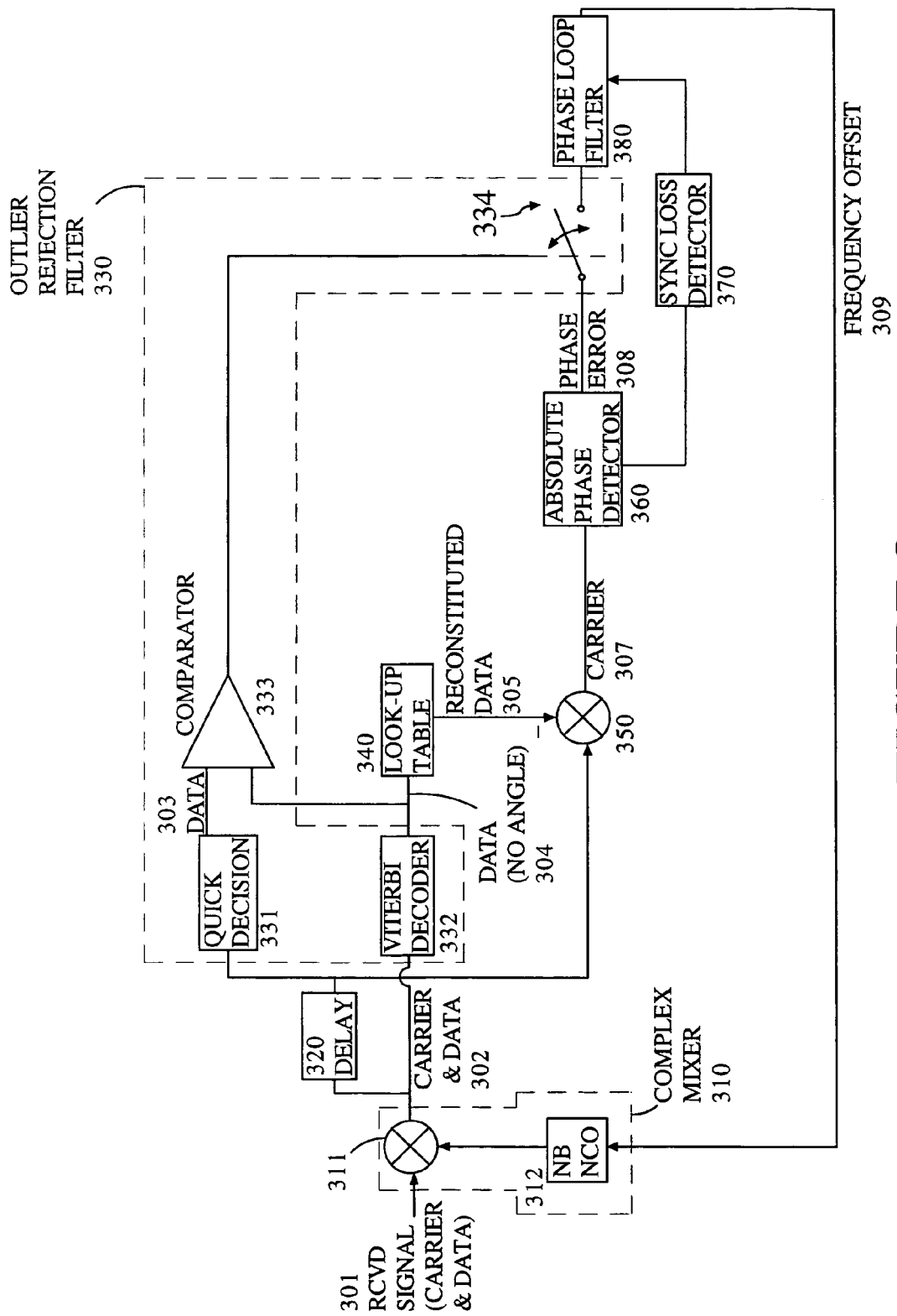
FIG. 3 is a functional block diagram of a phase lock loop according to the present invention which includes an outlier rejection filter, a synchronization loss detector, and a narrow band numerically controlled oscillator.

With reference now to FIG. 3, a preferred embodiment of the present invention is shown. One of the important features that distinguishes the present invention from the prior art is the outlier rejection filter 330. If a symbol is determined to be an "outlier", the phase error associated with the signal that carried the outlier symbol is dropped rather than being used to update the phase loop filter.

The received signal 301 is applied to the complex mixer 310, which is comprised of the mixer 311 and the narrow band numerically controlled oscillator 312. The complex mixer combines the received signal with a signal output from the narrow band numerically controlled oscillator which is controlled by the frequency offset signal 309 from the phase loop filter 380. The output of the complex mixer 310 is the carrier and data signal 302, which is applied to the delay circuit 320 and the Viterbi decoder 332. The Viterbi decoder preferably is a truncated Viterbi decoder, e.g., a Viterbi decoder that only uses, for example, the second symbol back from the present symbol instead of, for example, the thirty-fifth symbol back from the present symbol. It shall be understood by those of skill in the art that any type of Viterbi decoder may be used in the invention and that the particular example used herein is not to be construed as limiting the invention in any way. The delay circuit 320 compensates for the delay inherent in the Viterbi decoder 332 so that at the mixer 350, the carrier and data signal 306 is matched with the reconstituted data signal 350 and at the comparator 333 the data signal 303 from the quick decision circuit 331 is matched with the data signal 304 from the Viterbi decoder 332. One of skill in the art would understand that an obvious variation of the present invention would entail removing the delay circuit 320 and placing a delay circuit after the quick decision circuit 331 and a separate delay circuit prior to the mixer 350. Any combination of delay circuits to compensate for the delay inherent in the Viterbi decoder is contemplated by the present invention.

The carrier and data signal 302 is applied to the Viterbi decoder 332 to produce the data signal 304 which does not contain angle information. A delayed version of the carrier and data signal 306 is applied to the quick decision circuit, which produces the data signal 303. The data signal 303 from the quick decision circuit and the data signal 304 are applied to the comparator 333. The output of the comparator operates the switch 334 at the input to the phase loop filter 380. If the received signal is an outlier, the difference between the data signal 303 and the data signal 304 will be greater than a predetermined threshold. If the difference between the data signal 303 and the data signal 304 is greater than the predetermined threshold, the switch 334 is opened at the appropriate time, i.e., when the phase error signal 308 associated with the data signals 303 and 304 is output from the absolute phase detector 360, thereby preventing the phase error of the outlier signal from corrupting the phase loop filter.

The output of the Viterbi decoder 332, the data signal 304, does not contain any angle information. Therefore, in order to extract the carrier signal from the delayed carrier and data signal 306, the data signal 304 must be reconstituted, i.e., the angle information must be added back to the data signal 304. This is accomplished by the look-up table 340 by methods well known in the art. The output of the look-up table is the reconstituted data signal 305 which is applied to the mixer 350 for combining with the delayed carrier and data signal 306. The result of this combining of the reconstituted data signal 305 and the delayed carrier and data signal 306 is the carrier signal 307. The carrier signal is applied to the absolute phase detector circuit 360 which determines the phase of the carrier signal 307. The absolute phase detector circuit 360 produces the phase error signal 308 which is a function of the phase of the carrier signal 307. The phase error signal 308 is applied to the phase loop filter 380 via the switch 334 operated by the output of the comparator 333. If the phase error signal 308 is derived from a carrier signal 307 which is associated with an outlier as determined by the outlier rejection filter 330, the switch 334 is opened and the phase error signal 308 does not update the phase loop filter 380. On the other hand, if the phase error signal 308 is not derived from a carrier signal 307 associated with an outlier, then the phase error signal 308 is used to update the phase loop filter 380.

The sync loss detector 370 is also used to prevent the updating of the phase loop filter in the event synchronization between the receiver and transmitter is lost. The sync loss detector operates as described in commonly assigned U.S. patent application Ser. No. 10/098,470 entitled "ARQ COMBINING HOLDOFF SYSTEM AND METHOD", filed 18 Mar. 2002, now U.S. Pat. No. 7,036,065, incorporated herein by reference. The output of the phase loop filter 380 is the frequency offset signal 309 which is applied to the narrow band numerically controlled oscillator 312 of the complex mixer 310. The output of the narrow band numerically controlled oscillator is a function of the frequency offset signal 309.

Figure 4:
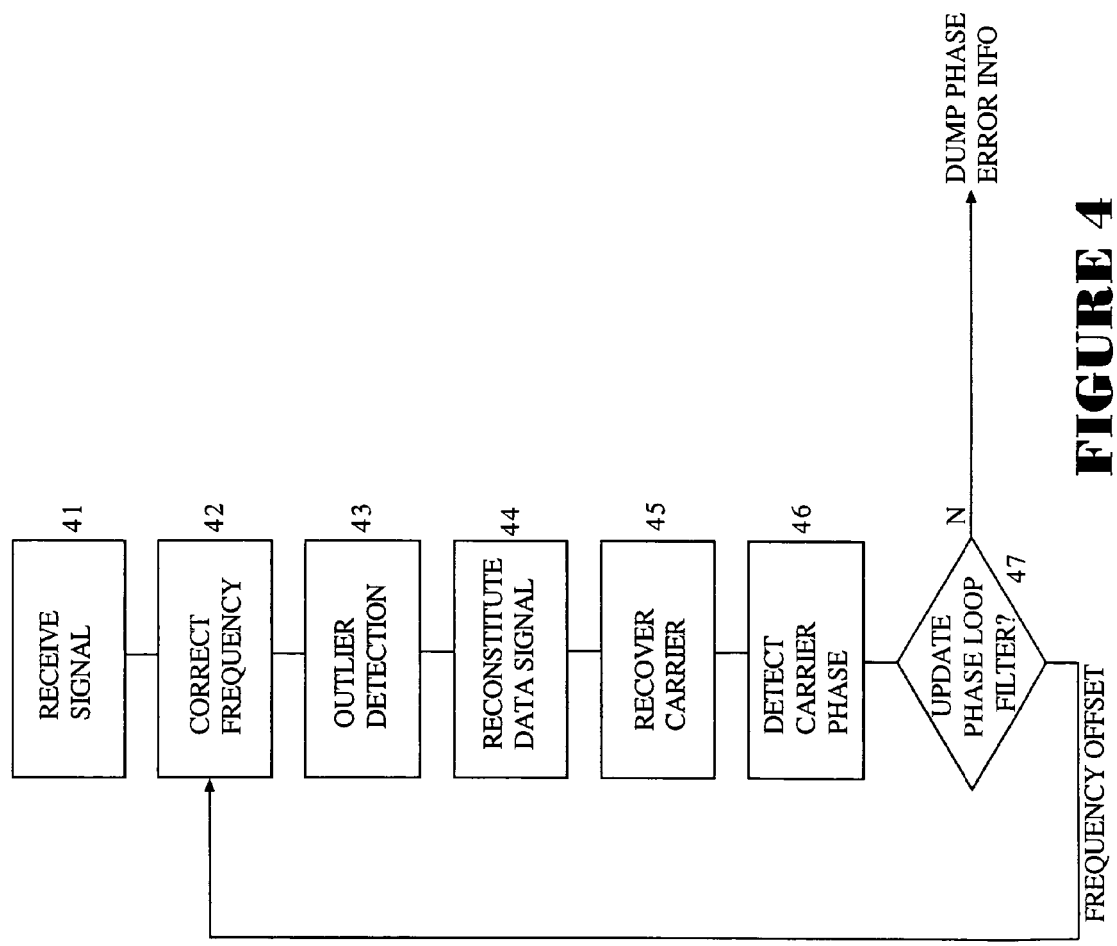
FIG. 4 is a flow chart which identifies the major steps in the operation of the invention.

With reference now to FIG. 4, the major method steps of the present invention are shown in the block diagram flow chart. The signal is received at step 41 and the frequency of the received signal is corrected at step 42. Outlier detection for the received signal, as described above, is performed at step 43. The data signal from the output of the Viterbi decoder is reconstituted at step 44 and the carrier signal is recovered at step 45. The phase of the carrier signal is detected at step 46. A decision is made regarding whether to update the loop filter at step 47. As discussed above, the decision for updating the loop filter is based on whether an outlier was detected or whether synchronization was lost. If the decision is made to not update the phase loop filter, the phase error information from the detecting carrier phase step is discarded. Otherwise, the phase loop filter is updated and the frequency offset signal is applied at the frequency correction step 42.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. In a phase lock loop in a communication system receiver for maintaining synchronization of the local oscillator of the receiver with the oscillator of a transmitter in response to the receipt of a communication signal by the receiver from the transmitter, where said phase lock loop produces a phase error signal responsive to the difference between the phase of the received communication signal with the phase of a reference signal produced by said local oscillator and automatically adjusts the phase of the reference signal responsive to the phase error signal, the improvement comprising only adjusting the phase of the reference signal responsive to a determination that the phase error is less than a predetermined threshold value, and preventing the phase error signal from adjusting the phase of the reference signal while producing an unadjusted reference signal at the local oscillator, responsive to a determination that the phase error is greater than a predetermined threshold; wherein the determination that the phase error is less than the predetermined threshold value is accomplished by comparing the output of a quick decision circuit with the output of a Viterbi decoder.

2. In a communication system comprising a transmitter and a receiver for the transmission of a communication signal comprising a carrier signal and a coded data signal, wherein said receiver includes a phase lock loop comprising a phase detector for producing a phase error signal responsive to the difference in phase between the carrier signal and a reference signal, a voltage controlled oscillator for producing the reference signal, and a low pass filter for producing a control signal responsive to said phase error signal, wherein said voltage controlled oscillator adjusts the frequency of the reference signal in response to the control signal, said phase lock loop having an in synch operation mode and a carrier recovery operation mode, the improvement wherein an outlier rejection filter is used to prevent the phase error signal from being input to the low pass filter while in the in synch operation mode in the event the outlier rejection filter determines the communication signal is an outlier.

3. The communication system of claim 2 including a synchronization loss detector for preventing the phase error signal from being input to the low pass filter in the event of a loss of synchronization between the transmitter and the receiver.

4. The communication system of claim 3 wherein the phase error signal is prevented from being input to the low pass filter by the synchronization loss detector for a predetermined time interval after the time the synchronization loss detector determines that there is a loss in synchronization.

5. The communication system of claim 3 wherein the synchronization loss detector determines a loss in synchronization as a function of at least one of the signal parameters selected from the group consisting of signal strength, carrier-to-interference ratio, and signal-to-noise ratio.

6. The communication system of claim 5 wherein the phase error signal is prevented from being input to the low pass filter by the synchronization loss detector for a predetermined time interval after the time the synchronization loss detector determines that there is a loss in synchronization.

7. The communication system of claim 2 wherein the determination that the communication signal is an outlier is determined by comparing the output of a quick decision circuit with the output of a Viterbi decoder.

8. A method of maintaining phase lock between a transmitter and a receiver including a phase lock loop having a dynamic bandwidth filter, whereby plural symbols which are representative of an encoded data signal are sent by the transmitter and received by the receiver, comprising the steps of:
(a) providing a one of said symbols at the receiver using a quick decision circuit to produce a first data signal;
(b) decoding said one of said symbols at the receiver using a Viterbi decoder to produce a second data signal;
(c) comparing the first data signal with the second data signal at the receiver;
(d) updating said filter to produce an adjusted reference signal at the receiver if the comparison of the first data signal and the second data signal satisfies a predetermined criteria; and
(e) refraining from updating said filter and producing an unadjusted reference signal at the receiver, if the comparison of the first data signal and the second data signal fails to satisfy the predetermined criteria.

9. The method of maintaining phase lock of claim 8 wherein the quick decision circuit measures the minimum Euclidean distance for said one symbol without decoding said symbol.

10. The method of maintaining phase lock of claim 8 wherein said Viterbi decoder decodes plural symbols by measuring the minimum Euclidean distance for said plural symbols.

11. The method of maintaining phase lock of claim 8 wherein the dynamic bandwidth filter is a dynamic bandwidth proportional-integral filter.

12. A method of maintaining phase lock between a transmitter and a receiver including a phase lock loop having a dynamic bandwidth filter, whereby plural symbols each of which are representative of a two bit encoded data signal are sent by the transmitter and received by the receiver, comprising the steps of:
(a) decoding said plural symbols using a Viterbi decoder to produce a decoded data signal at the receiver;
(b) updating said filter to produce an adjusted reference signal at the receiver if and only if the decoded data signal satisfies a predetermined criteria; and
(c) refraining from updating said filter and producing an unadjusted reference signal at the receiver if the decoded data signal fails to satisfy the predetermined criteria.

13. The method of maintaining phase lock of claim 12 wherein the Viterbi decoder decodes said plural symbols by measuring the minimum Euclidean distance for said plural symbols.

14. The method of maintaining phase lock of claim 13 wherein the Viterbi decoder must be capable of returning both original bits that were encoded.

15. The method of maintaining phase lock of claim 12 wherein the dynamic bandwidth filter is a dynamic bandwidth proportional-integral filter.

16. A method of maintaining synchronization between a transmitter and a receiver including a phase lock loop having a filter, whereby plural symbols which are representative of an encoded data signal are sent by the transmitter and received by the receiver, comprising the steps of:
(a) producing a first output signal using a Viterbi decoder;
(b) producing a second output signal from a quick decision circuit;
(c) testing each of said plural symbols at the receiver against a predetermined criteria;
(d) modifying the filter to produce an adjusted reference signal at the receiver if and only if said test is satisfactory; and
(e) refraining from modifying the filter and producing an unadjusted reference signal at the receiver if the test is unsatisfactory,
wherein said predetermined criteria is a comparison of the first output signal from the Viterbi decoder, the first output signal being without angle information and of the second output signal from the quick decision circuit, the second output signal having a delay by an amount of time substantially equal to the delay inherent in the Viterbi decoder.

17. The method of maintaining synchronization of claim 16 wherein said plural symbols at the receiver are tested against multiple criteria.

18. The method of maintaining synchronization of claim 16 wherein said predetermined criteria includes is the amplitude of the received symbol.

19. The method of maintaining synchronization of claim 16 wherein said predetermined criteria is derived from an impulse detector.

* * * * *